(12) United States Patent
Kashima

(10) Patent No.: US 8,933,821 B2
(45) Date of Patent: Jan. 13, 2015

(54) INFORMATION PROVIDING DEVICE AND INFORMATION PROVIDING METHOD

(75) Inventor: Hiroyuki Kashima, Machida (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 90 days.

(21) Appl. No.: 13/698,531

(22) PCT Filed: Apr. 14, 2011

(86) PCT No.: PCT/JP2011/059254
§ 371 (c)(1),
(2), (4) Date: Nov. 16, 2012

(87) PCT Pub. No.: WO2011/158547
PCT Pub. Date: Dec. 22, 2011

(65) Prior Publication Data
US 2013/0063283 A1 Mar. 14, 2013

(30) Foreign Application Priority Data
Jun. 17, 2010 (JP) ................................. 2010-137929

(51) Int. Cl.
*G08G 1/123* (2006.01)
*G08G 1/00* (2006.01)
(Continued)

(52) U.S. Cl.
CPC . *G08G 1/202* (2013.01); *B60L 3/12* (2013.01); *B60L 11/1844* (2013.01); *B60L 11/1846* (2013.01); *B60L 11/1862* (2013.01);
(Continued)

(58) Field of Classification Search
CPC ... Y02T 90/14; Y02T 10/7088; Y02T 90/166; Y02T 10/7038; B60L 11/1861; B60L 11/1809; B60W 2510/244; B60W 2710/244
USPC ............... 340/988, 455, 901, 995.1; 701/118; 320/109; 705/13
See application file for complete search history.

(56) References Cited

U.S. PATENT DOCUMENTS 5,892,346 A * 4/1999 Moroto et al. ................. 318/587
6,845,362 B2 * 1/2005 Furuta et al. .................... 705/13
(Continued)

FOREIGN PATENT DOCUMENTS

JP 09-210702 A 8/1997
JP 2003-021522 A 1/2003
(Continued)

*Primary Examiner* — Phung Nguyen
(74) *Attorney, Agent, or Firm* — Foley & Lardner LLP

(57) ABSTRACT

An information providing device has a vehicle information acquiring section acquiring information about a plurality of vehicles, a charge history information acquiring section acquiring charge history information, and a charging facility information acquiring section acquiring charging facility information including at least a position and a utilization status of a charging facility. The device further includes a searching section searching, according to a request from a request vehicle, for a charging facility utilizable by the request vehicle as an object charging facility, a vehicle determining section determining, as a specific vehicle, a vehicle that is not the request vehicle and having a possibility of utilizing the object charging facility, and a utilization possibility predicting section predicting a utilization possibility of the specific vehicle utilizing the object charging facility. The device also includes a providing section providing information based on the utilization possibility to the request vehicle.

9 Claims, 4 Drawing Sheets

(51) Int. Cl.
     *B60L 3/12*       (2006.01)
     *B60L 11/18*      (2006.01)
     *G06Q 10/06*      (2012.01)
     *G06Q 10/00*      (2012.01)
     *G01C 21/36*      (2006.01)
     *G08G 1/0962*     (2006.01)

(52) U.S. Cl.
     CPC ............... *G06Q10/06* (2013.01); *G06Q 10/20* (2013.01); *G01C 21/3679* (2013.01); *B60L 2240/622* (2013.01); *B60L 2240/642* (2013.01); *B60L 2240/645* (2013.01); *B60L 2240/72* (2013.01); *B60L 2250/16* (2013.01); *B60L 2260/44* (2013.01); *B60L 2260/52* (2013.01); *B60L 2260/58* (2013.01); *G08G 1/0962* (2013.01); *Y02T 10/7005* (2013.01); *Y02T 10/705* (2013.01); *Y02T 10/7088* (2013.01); *Y02T 10/7291* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 10/7044* (2013.01); *Y02T 90/169* (2013.01); *Y04S 10/126* (2013.01); *Y04S 30/14* (2013.01); *Y02E 60/721* (2013.01)
     USPC ........................................................ 340/988

(56) References Cited

U.S. PATENT DOCUMENTS

| | | | |
|---|---|---|---|
| 6,864,807 | B2 | 3/2005 | Todoriki et al. |
| 8,249,933 | B2 * | 8/2012 | Sakakibara et al. ....... 705/14.62 |
| 8,577,528 | B2 * | 11/2013 | Uyeki ............................. 701/22 |
| 2003/0006914 | A1 | 1/2003 | Todoriki et al. |
| 2012/0098676 | A1 * | 4/2012 | Oizumi et al. ................. 340/901 |
| 2012/0306446 | A1 * | 12/2012 | Suganuma et al. ............ 320/109 |
| 2013/0009765 | A1 * | 1/2013 | Gilman et al. ................. 340/455 |
| 2013/0079962 | A1 * | 3/2013 | Ishikawa et al. ................. 701/22 |
| 2013/0226441 | A1 * | 8/2013 | Horita ............................ 701/118 |
| 2013/0339108 | A1 * | 12/2013 | Ryder et al. ................. 705/14.1 |

FOREIGN PATENT DOCUMENTS

| | | |
|---|---|---|
| JP | 2003-262525 A | 9/2003 |
| JP | 2006-113887 A | 4/2006 |
| JP | 2006-113892 A | 4/2006 |
| JP | 2011-027433 A | 2/2011 |

* cited by examiner

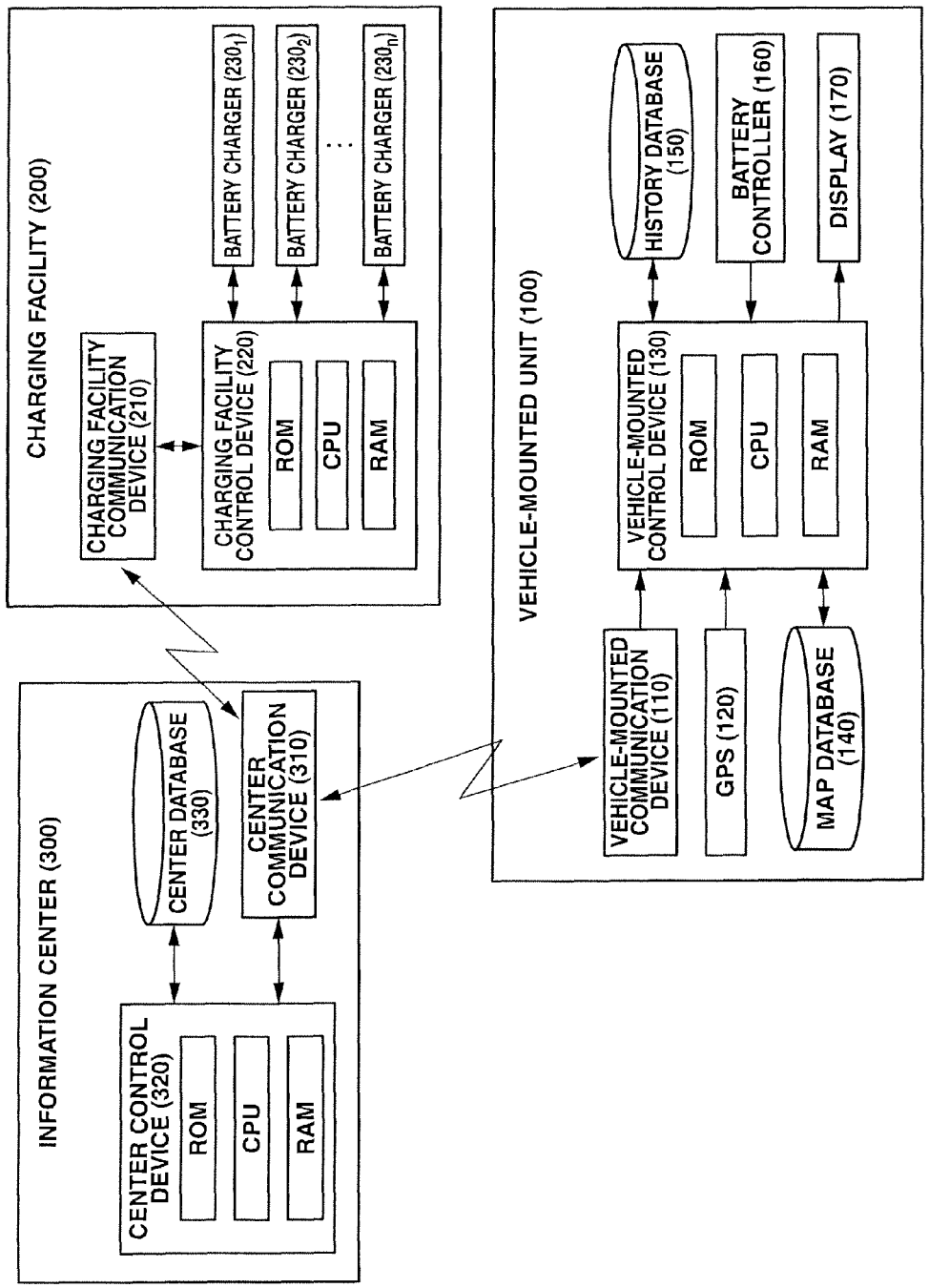

FIG.2

CHARGING FACILITY CODE : XXX-XXXXXX

TIME PERIOD : 6:00-9:00

| BATTERY REMAINING QUANTITY \ DISTANCE | 0-5km | 6-10km | 11-25km | 26-30km | 31-35km | 36-40km | 41-45km | 46-50km | 50km- |
|---|---|---|---|---|---|---|---|---|---|
| 0-10% | 20% | 18% | 16% | 14% | 12% | 10% | 8% | 6% | 4% |
| 11-20% | 10% | 10% | 8% | 8% | 6% | 6% | 4% | 4% | 2% |
| 21-30% | 8% | 8% | 6% | 6% | 4% | 4% | 2% | 2% | 1% |
| 31-40% | 6% | 6% | 4% | 4% | 2% | 2% | 1% | 1% | 1% |
| 41-50% | 4% | 4% | 2% | 2% | 1% | 1% | 1% | 1% | 1% |
| 51-60% | 2% | 2% | 1% | 1% | 1% | 1% | 1% | 1% | 1% |
| 61-70% | 1% | 1% | 1% | 1% | 1% | 1% | 1% | 1% | 1% |
| 71-80% | 1% | 1% | 1% | 1% | 1% | 1% | 1% | 1% | 1% |
| 81-90% | 1% | 1% | 1% | 1% | 1% | 1% | 1% | 1% | 1% |
| 91-100% | 1% | 1% | 1% | 1% | 1% | 1% | 1% | 1% | 1% |

TIME PERIOD : 9:00-12:00

| BATTERY REMAINING QUANTITY \ DISTANCE | 0-5km | 6-10km | 11-25km | 26-30km | 31-35km | 36-40km | 41-45km | 46-50km | 50km- |
|---|---|---|---|---|---|---|---|---|---|
| 0-10% | 18% | 16% | 14% | 12% | 10% | 8% | 6% | 4% | 2% |
| 11-20% | 9% | 9% | 8% | 8% | 7% | 6% | 4% | 2% | 1% |
| 21-30% | 7% | 7% | 6% | 6% | 5% | 4% | 2% | 1% | 1% |
| 31-40% | 5% | 5% | 4% | 4% | 3% | 2% | 1% | 1% | 1% |
| 41-50% | 3% | 3% | 2% | 2% | 2% | 1% | 1% | 1% | 1% |
| 51-60% | 2% | 2% | 1% | 1% | 1% | 1% | 1% | 1% | 1% |
| 61-70% | 1% | 1% | 1% | 1% | 1% | 1% | 1% | 1% | 1% |
| 71-80% | 1% | 1% | 1% | 1% | 1% | 1% | 1% | 1% | 1% |
| 81-90% | 1% | 1% | 1% | 1% | 1% | 1% | 1% | 1% | 1% |
| 91-100% | 1% | 1% | 1% | 1% | 1% | 1% | 1% | 1% | 1% |

.
.
.

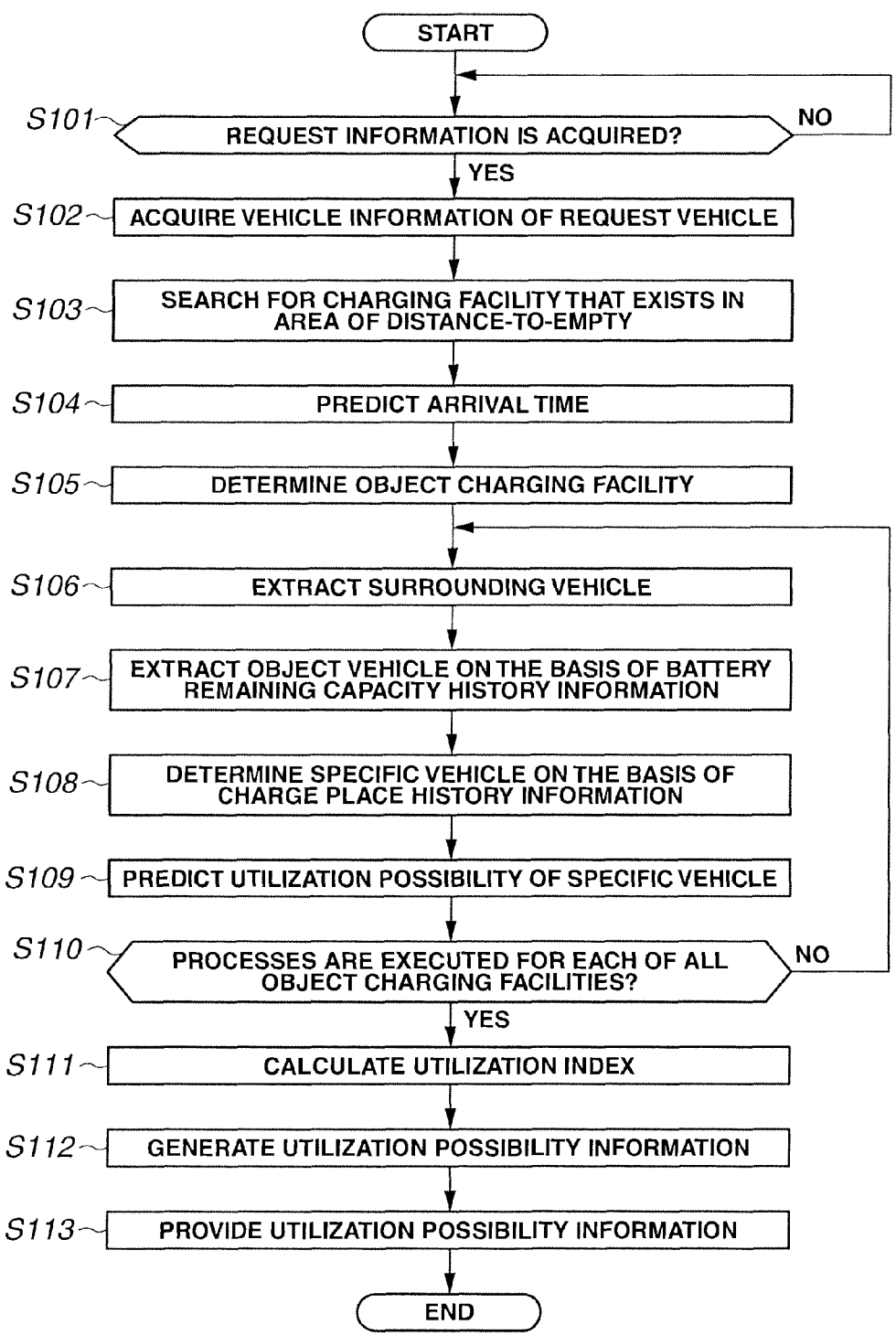

INFORMATION PROVIDING DEVICE AND INFORMATION PROVIDING METHOD

TECHNICAL FIELD

The present invention relates to an information providing device and an information providing method.

BACKGROUND ART

A system, which predicts a time period for which a charging facility is available on the basis of a reservation status and provides information of the predicted charging facility-available time period to a vehicle, has been known (Patent Document 1).

In the related art system, however, since the system is the one that predicts the charging facility-available time period on the basis of the reservation status, there is a case where the charging facility is used by other vehicles which have not made reservation during a time until a host vehicle reaches the charging facility. In this case, the host vehicle cannot start charging just after the host vehicle reaches the charging facility.

An object of the present invention is to provide an information providing device which is capable of properly providing information of the charging facility which the vehicle can use with a high probability.

CITATION LIST

Patent Document

Patent Document 1: Japanese Patent Provisional Publication Tokkai No. 2003-262525

SUMMARY OF THE INVENTION

To achieve the above object, in the present invention, on the basis of vehicle information of a plurality of vehicles and charge history information about charge history of a plurality of the vehicles, a charging facility which a request vehicle can use is searched as an object charging facility, a vehicle that has a possibility to use the object charging facility is determined as a specific vehicle from among vehicles except the request vehicle, a possibility for the specific vehicle to use the object charging facility is predicted as a utilization possibility on the basis of vehicle information of the specific vehicle, and information based on the predicted utilization possibility is provided to the request vehicle.

According to the present invention, since it is possible to predict the possibility that the vehicle except the request vehicle will use the charging facility, information of a charging facility that has a strong possibility for the request vehicle to be able to use (information of a charging facility which the request vehicle can use with a high probability) can be properly provided to the request vehicle.

BRIEF DESCRIPTION OF DRAWINGS

FIG. 1 is a block diagram of an information providing device of the present embodiment.

FIG. 2 is a drawing showing an example of utilization probability tables.

FIG. 3 is a flow chart showing an information providing process of the present embodiment.

DESCRIPTION OF EMBODIMENTS

Figure 4A:
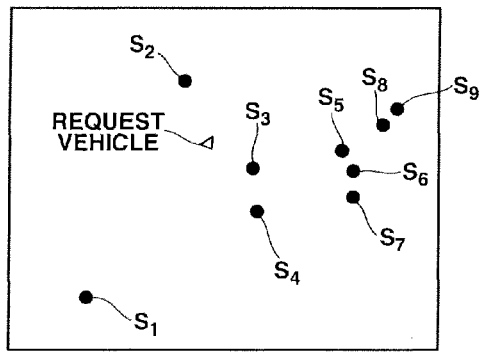
FIG. 4 are drawings for explaining the information providing process of the present embodiment.

In the following description, an embodiment of the present invention will be explained with reference to the drawings.

FIG. 1 is a block diagram of an information providing system of the present embodiment. As shown in FIG. 1, the information providing system has a vehicle-mounted unit 100 mounted on a vehicle, a charging facility 200 provided with a plurality of battery chargers for the vehicle and an information center 300 located outside the vehicle. In FIG. 1, for the sake of simplicity of explanation, a single vehicle-mounted unit 100 and a single charging facility 200 are shown as an example. However, in the information providing system of the present embodiment, the information center 300 can receive/send information from/to a plurality of vehicle-mounted units 100 and a plurality of charging facilities 200.

In the information providing system of the present embodiment, the information center 300 searches, according to a request from the vehicle-mounted unit 100, for a charging facility which a vehicle (hereinafter also called "request vehicle") mounting thereon the vehicle-mounted unit 100 that makes the request can use, and predicts a possibility that the searched charging facility will be used by vehicles except the request vehicle. The information providing system provides information indicating a possibility for the request vehicle to be able to use the charging facility, as utilization possibility information, to a user of the request vehicle.

First, a configuration of the vehicle-mounted unit 100 will be explained. The vehicle-mounted unit 100 is, for example, a navigation system mounted on the vehicle. As shown in FIG. 1, the vehicle-mounted unit 100 has a vehicle-mounted communication device 110, a GPS (Global Positioning System) 120, a vehicle-mounted control device 130, a map database 140, a history database 150, a battery controller 160 and a display 170. These components are connected to each other through CAN (Controller Area Network) and other vehicle-mounted LAN, the exchange of information can be then possible.

The vehicle-mounted communication device 110 is a communication terminal such as a cellular phone, a PHS (Personal Handy-phone System) and a wireless LAN. The vehicle-mounted communication device 110 receives vehicle information (described later in detail) from the vehicle-mounted control device 130, and sends the received information to the information center 300. Further, the vehicle-mounted communication device 110 receives the utilization possibility information indicating the possibility for a host vehicle to be able to use the charging facility from the information center 300, and sends the received utilization possibility information to the vehicle-mounted control device 130. In addition, in the present embodiment, the vehicle-mounted communication device 110 receives request information that requests the utilization possibility information from the vehicle-mounted control device 130, and sends it to the information center 300.

The GPS 120 detects radio waves transmitted from a plurality of communications satellites, and gets position information of the host vehicle, travelling direction information of the host vehicle and current time information periodically (e.g. every N sec.). Each information received by the GPS 120 is sent to the vehicle-mounted control device 130.

The map database 140 stores map data. The map data is displayed on a screen of the display 170 together with the position information of the host vehicle, position information of the charging facility and the utilization possibility information.

The history database 150 stores charge history information of the host vehicle in memory. The charge history information stored in the history database 150 is a history of each information of battery remaining capacity (remaining quantity) information at a charge start time, vehicle position information at the charge start time and time information at the charge start time. The charge history information stored in the history database 150 is sent to the information center 300 through the vehicle-mounted control device 130 at regular intervals, and is stored in a center database 330 of the information center 300.

The battery controller 160 periodically calculates the battery remaining capacity (battery remaining quantity) of the host vehicle on the basis of a detection data from a current sensor and a voltage sensor (both not shown), and sends the calculation result to the vehicle-mounted control device 130.

The vehicle-mounted control device 130 has a ROM (Read Only Memory) storing a program, a CPU (Central Processing Unit) executing the program stored in this ROM and a RAM (Random Access Memory) functioning as an accessible storage device. Here, as an operation circuit, an MPU (Micro Processing Unit), a DSP (Digital Signal Processor), an ASIC (Application Specific Integrated Circuit), an FPGA (Field Programmable Gate Array), etc. could be used instead of the CPU (Central Processing Unit) or together with the CPU (Central Processing Unit).

The vehicle-mounted control device 130 executes the program stored in the ROM by the CPU, thereby performing a destination setting function that sets a destination, a travelling route searching function that searches for a travelling route from a present position of the host vehicle to the destination, a distance-to-empty calculating function that calculates a distance the host vehicle can travel, a vehicle information acquiring function that acquires the vehicle information, a history information storing function that stores the charge history information of the host vehicle in the history database 150, a charge history information acquiring function that acquires the charge history information from the history database 150, a sending function that sends the charge history information and the vehicle information to the information center 300, a requesting function that requests the utilization possibility information, and a displaying function that displays the utilization possibility information on the screen of the display 170. In the following description, each function which the vehicle-mounted control device 130 has will be explained.

The destination setting function of the vehicle-mounted control device 130 sets the destination of the host vehicle. Setting of the destination by the destination setting function is made when the user inputs the destination through, for instance, input equipment (not shown), by storing the inputted destination in the RAM of the vehicle-mounted control device 130.

The travelling route searching function searches for the travelling route from the present position of the host vehicle to the destination on the basis of the position information of the host vehicle sent from the GPS 120, the map data stored in the map database 140 and the destination information set by the destination setting function, and stores information of the searched travelling route in the RAM of the vehicle-mounted control device 130. Here, in the present embodiment, as the travelling route, for example, the travelling route searching function could search for a route by which the host vehicle can arrive at the destination earliest from the present position.

The distance-to-empty calculating function of the vehicle-mounted control device 130 calculates the distance the host vehicle can travel on the basis of, for instance, the battery remaining capacity and electric power consumption information of the host vehicle, and stores information of the calculated distance-to-empty in the RAM of the vehicle-mounted control device 130.

The vehicle information acquiring function of the vehicle-mounted control device 130 acquires the position information of the host vehicle, the travelling direction information of the host vehicle and the current time information from the GPS 120, also acquires the battery remaining capacity information from the battery controller 160. Further, the vehicle information acquiring function acquires, from the RAM of the vehicle-mounted control device 130, the destination information set by the destination setting function, the travelling route information searched by the travelling route searching function and the distance-to-empty information calculated by the distance-to-empty calculating function. The vehicle information acquiring function then sends these acquired position information of the host vehicle, travelling direction information of the host vehicle, battery remaining capacity information, destination information, travelling route information and distance-to-empty information, as the vehicle information, to the information center 300 through the vehicle-mounted communication device 110.

The history information storing function of the vehicle-mounted control device 130 generates the charge history information, upon starting the battery charge by an external power source, by storing the battery remaining capacity information at the charge start time, the vehicle position information at the charge start time and the time information at the charge start time in the history database 150.

The charge history information acquiring function of the vehicle-mounted control device 130 acquires the charge history information stored in the history database 150.

The sending function of the vehicle-mounted control device 130 sends the charge history information acquired by the charge history information acquiring function and the vehicle information acquired by the vehicle information acquiring function to the information center 300 through the vehicle-mounted communication device 110 at regular intervals. The charge history information and the vehicle information sent by the sending function are received by the information center 300, and are stored in the center database 330 of the information center 300.

The requesting function of the vehicle-mounted control device 130 sends the request information that requests the utilization possibility information to the information center 300 through the vehicle-mounted communication device 110. Here, regarding a manner of the request of the utilization possibility information by the requesting function, it is not especially limited. For instance, the request of the utilization possibility information could be made to the information center 300 at predetermined intervals. Or, the request of the utilization possibility information could be made by user's operation through the input equipment (not shown) with user's arbitrary timing.

The displaying function of the vehicle-mounted control device 130 displays the utilization possibility information on the display 170 by sending the utilization possibility information to the display 170 when acquiring the utilization possibility information (described later in detail) indicating the possibility for the host vehicle to be able to use the charging facility from the information center 300.

The display 170 receives the utilization possibility information from the displaying function of the vehicle-mounted control device 130, and displays the received utilization possibility information on the screen provided in the display 170. More specifically, the display 170 displays a charging facility having a strong possibility for the host vehicle to be able to use (a charging facility which the host vehicle can use with a high probability), for example, with a different color or a different icon from that of other charging facilities, on the basis of the utilization possibility information. With this display, it is possible to show the charging facility which the host vehicle can use with the high probability to the user.

Here, a device showing the utilization possibility information to the user of the vehicle is not limited to the display 170. For instance, a speaker or a device using the speaker could inform the vehicle user of the utilization possibility information by voice or sound.

Next, the charging facility 200 will be explained. The charging facility 200 is a facility for charging the battery mounted on the vehicle. As shown in FIG. 1, the charging facility 200 is provided with a charging facility communication device 210, a charging facility control device 220 and a plurality of battery chargers $230_1$~$230_n$.

The charging facility communication device 210 receives charging facility information (described later in detail) from the charging facility control device 220, and sends the received charging facility information to the information center 300.

The battery chargers $230_1$~$230_n$ are devices for charging the battery mounted on the vehicle.

The charging facility control device 220 has a ROM in which a program is stored, a CPU executing the program stored in this ROM and a RAM functioning as an accessible storage device. The charging facility control device 220 executes the program stored in the ROM by the CPU, thereby performing a charging facility information acquiring function that acquires the charging facility information.

The charging facility information acquiring function of the charging facility control device 220 acquires position information of the charging facility stored in the RAM of the charging facility control device 220 and number information of the battery charger provided in the charging facility. Further, the charging facility information acquiring function acquires, from the battery chargers $230_1$~$230_n$, charging facility utilization status information that indicates whether or not each of the battery chargers $230_1$~$230_n$ is being used and charge time information that indicates time required for the battery of the vehicle to be fully charged. The charging facility information acquiring function then periodically sends these acquired position information of the charging facility, number information of the battery charger provided in the charging facility, charging facility utilization status information and charge time information, as the charging facility information, to the information center 300 through the charging facility communication device 210.

Next, the information center 300 will be explained. The information center 300 is, for instance, a server provided outside the vehicle. The information center 300 predicts the possibility for the vehicle mounting thereon the vehicle-mounted unit 100 to be able to use the charging facility, on the basis of the vehicle information and the charge history information sent from a plurality of the vehicle-mounted units 100 which exists within a control area of the information center 300 and the charging facility information sent from a plurality of the charging facilities 200 which exists within the control area of the information center 300. With this prediction, the information center 300 generates information indicating the possibility for the vehicle to be able to use the charging facility, as the utilization possibility information, and provided the generated utilization possibility information to the vehicle-mounted unit 100. As shown in FIG. 1, the information center 300 is provided with a center communication device 310, a center control device 320 and the center database 330.

The center communication device 310 receives the charging facility information sent from a plurality of the charging facilities 200 existing within the control area of the information center 300 and the vehicle information and the charge history information sent from a plurality of the vehicle-mounted units 100 existing within the control area of the information center 300, and sends these charging facility information, vehicle information and charge history information to the center control device 320. Further, the center communication device 310 receives, from the center control device 320, the utilization possibility information generated by the center control device 320, and sends the generated utilization possibility information to the vehicle-mounted unit 100.

The center control device 320 has a ROM, a CPU and a RAM. The center control device 320 executes a program stored in the ROM by the CPU, thereby performing a storing function that stores the charge history information and the vehicle information sent from the vehicle-mounted unit 100 and the charging facility information sent from the charging facility 200 in the center database 330, a request information acquiring function that acquires the request information from the vehicle that requests the utilization possibility information and the vehicle information of the request vehicle, a traffic information acquiring function that acquires traffic information from a traffic information server (not shown), a charging facility searching function that searches for a charging facility which the vehicle is able to use, a determining function that determines a vehicle that has a possibility to use the charging facility, a table generating function that generates a utilization probability table by an actual result based on the fact that the vehicle used the charging facility, a utilization possibility predicting function that predicts the possibility for the vehicle determined by the determining function to use the charging facility, and a utilization possibility information generating function that generates the utilization possibility information. In the following description, each function which the center control device 320 has will be explained.

The storing function of the center control device 320 acquires the charge history information and the vehicle information sent at regular intervals from the vehicle-mounted unit 100 through the center communication device 310, and stores the acquired charge history information and vehicle information in the center database 330. Further, the storing function acquires the charging facility information sent from the charging facility 200, and stores the acquired charging facility information in the center database 330.

The request information acquiring function of the center control device 320 acquires, from the vehicle-mounted unit 100 of the request vehicle that requests the utilization possibility information, the request information that requests the utilization possibility information and the vehicle information of the request vehicle which is sent along with the request information through the center communication device 310.

The traffic information acquiring function of the center control device 320 acquires the traffic information from a traffic information center (not shown) through the center communication device 310.

The table generating function of the center control device 320 generates the utilization probability table that indicates a probability that the vehicle will use the charging facility, on the basis of the fact that the vehicle used the charging facility.

Here, FIG. 2 is a drawing showing an example of the utilization probability table generated by the table generating function.

As shown in FIG. 2, the utilization probability table is generated for each charging facility. In each utilization probability table in FIG. 2, a probability that the vehicle will use the charging facility is shown in accordance with a distance from the position of the charging facility to the position of the vehicle and the battery remaining capacity of the vehicle. For example, the utilization probability table (an upper side utilization probability table) in FIG. 2 shows that a vehicle, which exists within a range of 0 km~5 km from the position of the charging facility and whose battery remaining capacity (SOC: state of charge of the battery) is within a range of 0%~10%, uses the charging facility with a 20% probability. Also, the upper side utilization probability table shows that a vehicle, which exists within a range of 6 km~10 km from the position of the charging facility and whose battery remaining capacity (SOC) is within the range of 0%~10%, uses the charging facility with an 18% probability.

Here, a generating manner of the utilization probability table by the table generating function will be explained. Although the generating manner of the utilization probability table by the table generating function is not especially limited, in the present embodiment, for instance, it is detected whether or not a plurality of vehicles, each of which exists within an area whose radius from the position of the charging facility is 0 km~5 km and each battery remaining capacity (SOC) of which is within the range of 0%~10%, actually used the charging facility. Then by performing a statistical processing of the actual result based on the fact that the vehicle used the charging facility from the detection result, as shown in FIG. 2, it is possible to determine the probability that the vehicle, which exists within the range of 0 km~5 km from the position of the charging facility and whose battery remaining capacity (SOC) is within the range of 0%~10%, will use the charging facility. Likewise, by performing the statistical processing of the actual result based on the fact that a plurality of the vehicles used the charging facility in the other conditions (different distances from the position of the charging facility, different battery remaining capacities), the table generating function can generate the utilization probability table shown in FIG. 2.

Further, as shown in FIG. 2, the table generating function generates the utilization probability table for each predetermined time period (hours). For example, in the example shown in FIG. 2, the utilization probability table according to the time period from six o'clock (6:00) to nine o'clock (9:00) and the utilization probability table according to the time period from nine o'clock (9:00) to twelve o'clock (12:00) are generated. Likewise, utilization probability tables according to the time periods are generated. By performing the statistical processing of the actual result based on the fact that a plurality of the vehicles which exist within a predetermined area (range) from the position of the charging facility and whose battery remaining capacities are within a predetermined range used the charging facility for instance for a time of 6:00~6:10, as shown in FIG. 2, the table generating function can the utilization probability table according to the time period from six o'clock (6:00) to nine o'clock (9:00).

By generating the utilization probability table according to each time period in this way, it is possible to generate an accurate utilization probability table with consideration given to an influence of traffic condition (e.g. there is a strong possibility that traffic jam will occur at rush-hour time in the morning, while traffic during daytime is decreased as compared with the morning) which is different in accordance with the time period.

The generating manner of the utilization probability table by the table generating function is not limited to the above manner. For instance, it could be possible to generate the utilization probability table, on the basis of the charge history information of each vehicle, by acquiring the actual result based on the fact that each vehicle used the charging facility in the past. Furthermore, it might be possible to generate the utilization probability table with consideration given to, for instance, physical condition (shape) of road (e.g. slope or gradient) or cost relating to the charge. This is because, for example, when a plurality of charging facilities exist at relatively close positions, a probability to use each charging facility would be different according to the physical condition of road or the charge cost.

Here, in the utilization probability table in the present embodiment, the distance range of "0 km~5 km" shown in FIG. 2 means that the distance from the position of the charging facility is greater than or equal to 0 km and is less than 6 km. Further, the distance range of "6 km~10 km" shown in FIG. 2 means that the distance from the position of the charging facility is greater than or equal to 6 km and is less than 11 km. Likewise, other ranges, shown in FIG. 2, whose distances from the position of the charging facility are different from the above distances also have the same meaning. Moreover, the battery remaining capacity range of "0%~10%" shown in FIG. 2 means that the battery remaining capacity (SOC) is greater than or equal to 0% and is less than 11%. Further, the battery remaining capacity range of "11%~20%" shown in FIG. 2 means that the battery remaining capacity (SOC) is greater than or equal to 11% and is less than 21%. Likewise, other ranges, shown in FIG. 2, whose battery remaining capacities (SOC) are different from the above battery remaining capacities (SOC) also have the same meaning.

The utilization probability table shown in FIG. 2 is an example. It might be possible to generate the utilization probability table, for instance, with the distance range of "0 km~5 km" shown in FIG. 2 meaning that the distance from the position of the charging facility is greater than or equal to 0 km and is less than or equal to 5 km. Likewise, it might be possible to generate the utilization probability table, for instance, with the battery remaining capacity range of "0%~10%" shown in FIG. 2 meaning that the battery remaining capacity (SOC) is greater than or equal to 0% and is less than or equal to 10%.

The charging facility searching function, the determining function, the utilization possibility predicting function and the utilization possibility information generating function of the center control device 320 are functions for achieving the generation of the utilization possibility information indicating the possibility for the vehicle to be able to use the charging facility. These functions will be explained later in detail.

The center database 330 stores therein the vehicle information and the charge history information sent from a plurality of the vehicle-mounted units 100 existing within the control area of the information center 300 and the charging facility information sent from a plurality of the charging facilities 200 existing within the control area of the information center 300. Further, the center database 330 stores also the utilization probability table generated by the table generating function of the center control device 320. The vehicle information, the charge history information, the charging facility information and the utilization probability table stored in the center database 330 are used for generating the utilization possibility information in an after-mentioned information providing process.

Next, the information providing process of the present embodiment will be explained with reference to FIG. 3. FIG. 3 is a flow chart showing the information providing process of the present embodiment. The information providing process of the present embodiment is executed by the center control device 320 of the information center 300. By sending the request information to the information center 300 by the requesting function of the vehicle-mounted unit 100 mounted on the vehicle (hereinafter called the request vehicle) that requests the utilization possibility information and also acquiring the request information by the request information acquiring function of the center control device 320, the information providing process is started. FIGS. 4A to 4E are drawings for explaining the information providing process of the present embodiment.

In the following description, as an example, a case, where the utilization possibility information of a charging facility that has a strong possibility for the request vehicle to be able to use (a charging facility which the request vehicle can use with a high probability) from charging facilities $S_1$~$S_9$ shown in FIG. 4A is provided to the request vehicle, will be explained.

First, at step S101, a judgment is made as to whether or not the request information sent from the vehicle-mounted unit 100 of the request vehicle is acquired by the request information acquiring function of the center control device 320. When judging that the request information is acquired, the routine proceeds to step S102. When judging that the request information is not acquired at step S101, the routine stands by at step S101. At subsequent step S102, the vehicle information of the request vehicle sent from the vehicle-mounted unit 100 of the request vehicle together with the request information is acquired by the request information acquiring function.

Then at steps S103~S105, the charging facility which the request vehicle can use is searched by the charging facility searching function of the center control device 320. At step S103, on the basis of the position information of the request vehicle and the distance-to-empty information of the vehicle information of the request vehicle acquired at step S102 and the position information of the charging facility of the charging facility information stored in the center database 330, a charging facility that exists within an area of the distance-to-empty of the request vehicle is searched by the charging facility searching function. The searched charging facility is then set as a vehicle-reachable charging facility.

By searching for the vehicle-reachable charging facility on the basis of the distance-to-empty information in this way, it is possible to properly searching for the charging facility which the request vehicle can reach.

For example, as shown in FIG. 4A, in a case where there are nine charging facilities $S_1$~$S_9$ and charging facilities $S_2$~$S_4$ of these charging facilities $S_1$~$S_9$ exist within the area of the distance-to-empty of the request vehicle, on the basis of the distance-to-empty information of the request vehicle, the charging facilities $S_2$~$S_4$ which the request vehicle can reach are searched as the vehicle-reachable charging facility by the charging facility searching function.

At step S104, on the basis of the position information of the request vehicle of the vehicle information of the request vehicle acquired at step S102 and position information of the vehicle-reachable charging facility of the charging facility information stored in the center database 330, a time when the request vehicle reaches the vehicle-reachable charging facility is predicted by the charging facility searching function.

More specifically, first, a travelling route from the present position of the request vehicle to the vehicle-reachable charging facility is searched by the charging facility searching function on the basis of the position information of the request vehicle and the position information of the vehicle-reachable charging facility. Then the charging facility searching function adds the traffic information acquired by the traffic information acquiring function of the center control device 320 to the searched travelling route information, and predicts the time when the request vehicle reaches the vehicle-reachable charging facility as an arrival time.

In this way, by predicting traffic condition of the travelling route to the vehicle-reachable charging facility using the traffic information, it is possible to accurately predict the arrival time when the request vehicle reaches the vehicle-reachable charging facility.

At step S105, on the basis of utilization status information of the vehicle-reachable charging facility of the charging facility information stored in the center database 330, the vehicle-reachable charging facility which the request vehicle can use at the arrival time predicted at step S104 is determined as an object charging facility by the charging facility searching function. For instance, the charging facility searching function determines a vehicle-reachable charging facility that has a battery charger which is not reserved for the arrival time, as the object charging facility which the request vehicle can use at the arrival time, on the basis of a reservation status of the vehicle-reachable charging facility.

Next, at steps S106~S109, the determining function of the center control device 320 determines a specific vehicle that has a possibility to use the object charging facility for each object charging facility determined at step S105. In the following description, as shown in FIG. 4B, as an example, a process that determines a specific vehicle that has a possibility to use an object charging facility $S_4$ with the charging facility $S_4$ being the object charging facility will be explained.

First, at step S106, by the determining function of the center control device 320, a vehicle that exists around the object charging facility is extracted from among the vehicles except the request vehicle, and the extracted vehicle is set as a surrounding vehicle. More specifically, on the basis of position information of the object charging facility of the charging facility information stored in the center database 330 and the position information of the request vehicle of the vehicle information of the request vehicle acquired at step S102, the determining function determines a circular area whose radius is a distance from the position of the object charging facility to the position of the request vehicle with the position of the object charging facility being a center. Then, on the basis of the position information of the vehicle except the request vehicle from the vehicle information stored in the center database 330, the determining function extracts the vehicle, which exists within the determined circular area, except the request vehicle, and this extracted vehicle is set as the surrounding vehicle.

In this way, in the present embodiment, by extracting the vehicle, except the request vehicle, which exists within the determined circular area whose radius is the distance from the position of the object charging facility to the position of the request vehicle with the position of the object charging facility being the center, it is possible to properly extract the surrounding vehicle that has a possibility to use the object charging facility in advance of or earlier than the request vehicle.

Figure 4B:
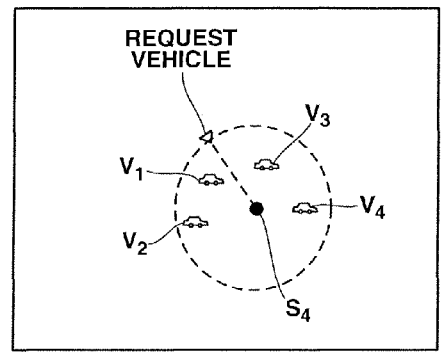

For example, as shown in FIG. 4B, the determining function determines a circular area whose radius is a distance from the position of the object charging facility $S_4$ to the position of the request vehicle with the position of the object charging facility $S_4$ being the center. Then the determining function extracts vehicles $V_1$~$V_4$, which exist within this circular area, except the request vehicle, and these extracted vehicles $V_1$~$V_4$ are set as the surrounding vehicle.

At subsequent step S107, by the determining function, on the basis of battery remaining capacity history information (the history of the battery remaining capacity at the charge start time) of the surrounding vehicle of the charge history information stored in the center database 330, a vehicle that has a possibility to use the object charging facility is extracted from the surrounding vehicles extracted at step S106, and the extracted vehicle is set as an object vehicle. More specifically, on the basis of the history information of the battery remaining capacity at the charge start time of the surrounding vehicle extracted at step S106, the determining function calculates, for instance, an average of the battery remaining capacity at the charge start time.

Further, on the basis of the battery remaining capacity information of the surrounding vehicle of the vehicle information stored in the center database 330, the determining function compares a current battery remaining capacity and the average of the battery remaining capacity at the charge start time for each of the surrounding vehicles, then extracts a vehicle whose current battery remaining capacity is lower than whose average of the battery remaining capacity at the charge start time, as the object vehicle, from the surrounding vehicles.

In this way, in the present embodiment, by extracting the vehicle whose current battery remaining capacity is lower than whose average of the battery remaining capacity at the charge start time, it is possible to properly extract the vehicle that has a strong possibility to use the object charging facility (to properly extract the vehicle that uses the object charging facility with a high probability).

Figure 4C:
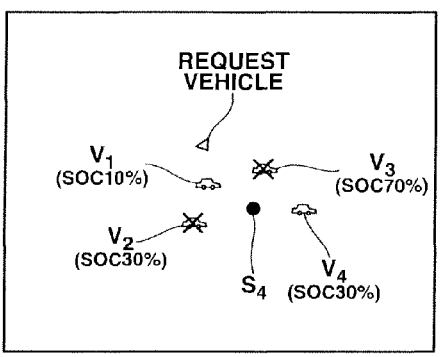

For example, as shown in FIG. 4C, in a case where the average of the battery remaining capacity at the charge start time of the surrounding vehicle $V_1$ is "SOC 20%", since the current battery remaining capacity of the surrounding vehicle $V_1$ is "SOC 10%", the determining function extracts the surrounding vehicle $V_1$ whose current battery remaining capacity "SOC 10%" is lower than whose average of the battery remaining capacity "SOC 20%" at the charge start time, as the object vehicle.

Further, as shown in FIG. 4C, in a case where the average of the battery remaining capacity at the charge start time of the surrounding vehicle $V_2$ is "SOC 20%", since the current battery remaining capacity of the surrounding vehicle $V_2$ which is "SOC 30%" is higher than the average of the battery remaining capacity at the charge start time of the surrounding vehicle $V_2$ which is "SOC 20%", the determining function excludes the surrounding vehicle $V_2$ from the object vehicle. Likewise, in a case where the average of the battery remaining capacity at the charge start time of the surrounding vehicle $V_3$ is "SOC 20%", the determining function excludes the surrounding vehicle $V_3$ whose current battery remaining capacity is "SOC 70%" from the object vehicle.

On the other hand, as shown in FIG. 4C, in a case where the average of the battery remaining capacity at the charge start time of the surrounding vehicle $V_4$ is "SOC 40%", the determining function extracts the surrounding vehicle $V_4$ whose current battery remaining capacity is "SOC 30%", as the object vehicle.

In this way, in the above example, by the determining function, the surrounding vehicle $V_1$ and the surrounding vehicle $V_4$ are extracted, as the object vehicle, from the surrounding vehicles $V_1$~$V_4$.

At step S108, by the determining function, on the basis of charge place history information (the history of the vehicle position information at the charge start time) of the object vehicle of the charge history information stored in the center database 330, a charging facility used by the object vehicle with a high utilization frequency is detected, and an object vehicle that can not use this charging facility having the high utilization frequency is determined as a specific vehicle.

More specifically, on the basis of the charge place history information of the object vehicle, first, the determining function detects, as a regular-use charging facility, the charging facility used for the charge by each object vehicle with a high frequency. For instance, the determining function could detect a charging facility, such as a home (garage) and company's parking lot, where the object vehicle was charged with a 30% or more frequency of a whole, as the regular-use charging facility having the high frequency of the charge by the object vehicle. Then, on the basis of distance-to-empty information of the object vehicle or the battery remaining capacity information of the object vehicle of the vehicle information stored in the center database 330, the determining function extracts a vehicle that can not reach the regular-use charging facility from the object vehicle, and the extracted vehicle is determined as the specific vehicle.

In this way, in the present embodiment, it is judged that an object vehicle that can reach the regular-use charging facility has a strong possibility to charge the battery at the regular-use charging facility (it is judged that an object vehicle that can reach the regular-use charging facility is charged at the regular-use charging facility with a high probability). Then by excluding this object vehicle from the specific vehicle, it is possible to properly determine the specific vehicle that has a strong possibility to use the object charging facility.

Figure 4D:
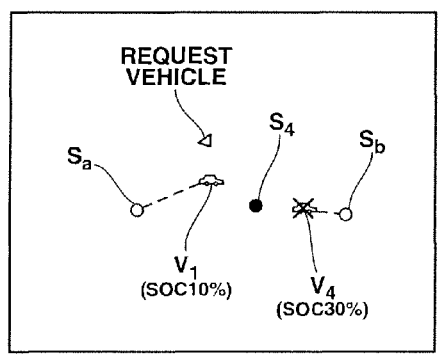

For example, as shown in FIG. 41D, a regular-use charging facility $S_a$ for the object vehicle $V_1$ is detected. Then when the battery remaining capacity of the object vehicle $V_1$ is "SOC 10%" and the object vehicle $V_1$ can not reach the regular-use charging facility $S_a$, the determining function determines the object vehicle $V_1$ as the specific vehicle. On the other hand, as shown in FIG. 4D, a regular-use charging facility $S_b$ for the object vehicle $V_4$ is detected. Then when the battery remaining capacity of the object vehicle $V_4$ is "SOC 30%" and the object vehicle $V_4$ can reach the regular-use charging facility $S_b$, the determining function excludes the object vehicle $V_4$ from the specific vehicle.

Figure 4E:
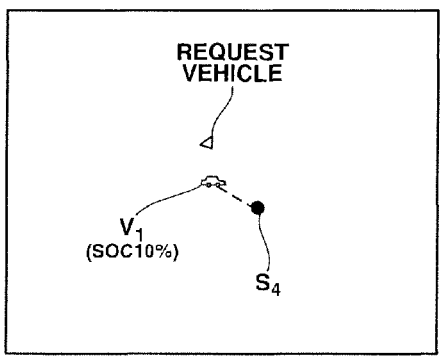

With this determination/exclusion, as shown in FIG. 4E, only the object vehicle $V_1$ is determined as the specific vehicle.

In this way, at steps S106~S108, by the determining function, the specific vehicle that has the possibility to use the object charging facility is determined. Here, at step S108, in a case where the regular-use charging facility can not be searched or the regular-use charging facility is the object charging facility, the determining function would determine the object vehicle as the specific vehicle, and the routine proceeds to step S109.

The determining manner of the specific vehicle by the determining function is not limited to the above manner. Instead of the above manner, or in addition to the above manner, it could be possible to use a manner explained below.

For instance, in a case where it is judged that the travelling route is a greatly indirect route (it is judged that the vehicle makes a detour) for travelling toward the destination by way of (via) the object charging facility, the determining function judges that the vehicle does not use this object charging facility, and would exclude this vehicle from the specific vehicle.

More specifically, on the basis of the travelling direction information of the vehicle and the position information of the vehicle of the vehicle information stored in the center database 330 and the position information of the object charging facility of the charging facility information stored in the center database 330, the determining function detects a position of the object charging facility for the travelling direction of the vehicle. Then when the object charging facility exists in a direction that has a 90 degree or more angle with respect to the travelling direction of the vehicle, the determining function judges that there is a small possibility that the vehicle will use this object charging facility, and would exclude this vehicle from the specific vehicle.

Further, on the basis of the travelling route information of the vehicle and the destination information of the vehicle information stored in the center database 330 and the position information of the object charging facility of the charging facility information stored in the center database 330, the determining function calculates a travel distance of a case where the vehicle travels up to the destination by way of the object charging facility and a travel distance of a case where the vehicle travels up to the destination not by way of the object charging facility. Then when the travel distance of the case where the vehicle travels up to the destination by way of the object charging facility is 50% or more longer than the travel distance of the case where the vehicle travels up to the destination not by way of the object charging facility, the determining function judges that there is a small possibility that this vehicle will use the object charging facility, and would exclude this vehicle from the specific vehicle.

Then, at step S109, by the utilization possibility predicting function of the center control device 320, by using the utilization probability table shown in FIG. 2, a possibility for the specific vehicle determined at step S108 to use the object charging facility is predicted. More specifically, on the basis of position information of the specific vehicle of the vehicle information stored in the center database 330 and the position information of the object charging facility of the charging facility information stored in the center database 330, first, the utilization possibility predicting function calculates a distance from the position of the specific vehicle to the position of the object charging facility. Then, by referring to the utilization probability table shown in FIG. 2, the utilization possibility predicting function predicts, as the possibility for the specific vehicle to use the object charging facility, the utilization probability according to the calculated distance from the position of the specific vehicle to the position of the object charging facility and battery remaining capacity of the specific vehicle of the vehicle information stored in the center database 330.

For instance, when using the utilization probability table shown in FIG. 2, regarding the specific vehicle which exists within the range of 0 km~5 km from the position of the specific vehicle to the position of the object charging facility and whose battery remaining capacity (SOC) is within the range of 0%~10%, the utilization possibility predicting function predicts that the possibility for this specific vehicle to use the object charging facility is 20%. Also, regarding the specific vehicle which exists within the range of 6 km~10 km from the position of the specific vehicle to the position of the object charging facility and whose battery remaining capacity (SOC) is within the range of 0%~10%, the utilization possibility predicting function predicts that the possibility for this specific vehicle to use the object charging facility is 18%.

Then, at step S110, by the utilization possibility information generating function of the center control device 320, a judgment is made as to whether or not processes of steps S106~S109 are executed for each of all the object charging facilities determined at step S105. When the processes of steps S106~S109 are executed for each of all the object charging facilities, the routine proceed to step S111. On the other hand, when judging that there remains an object charging facility for which the processes of steps S106~S109 are not executed, the routine returns to step S106. Then, with regard to this object charging facility for which the processes of steps S106 S109 are not executed, the processes of steps S106~S109 for this object charging facility are executed.

At step S111, by the utilization possibility information generating function, on the basis of the utilization possibilities of all the specific vehicles predicted at step S109, a utilization index is calculated. More specifically, the utilization possibility information generating function calculates, as the utilization index, a value obtained by adding the predicted utilization possibilities of all the specific vehicles.

For instance, in a case where two specific vehicles are determined for a certain object charging facility and the prediction of the utilization possibility of one specific vehicle is 20% and the prediction of the utilization possibility of the other specific vehicle is 18%, a value "38" obtained by adding 20(%) that is the utilization possibility predicted for the one specific vehicle and 18(%) that is the utilization possibility predicted for the other specific vehicle is calculated, as the utilization index, by the utilization possibility information generating function.

The calculating manner of the utilization index by the utilization possibility information generating function is not limited to the above manner. For instance, it is possible to calculate the utilization index by a manner explained below.

For example, the utilization possibility information generating function could judge that there is a possibility that even the vehicle excluded from the specific vehicle will use the object charging facility, and calculates the utilization index with consideration given to the utilization possibility of the vehicle excluded from the specific vehicle.

Also, on the basis of utilization status information of the object charging facility of the charging facility information stored in the center database 330, the utilization possibility information generating function could calculate the utilization index by dividing the value obtained by adding the predicted utilization possibilities of all the specific vehicles by the number of battery chargers which are not being used among the battery chargers provided in the charging facility. For instance, in a case where the value obtained by adding the predicted utilization possibilities of all the specific vehicles is "38" and the number of battery chargers which are not being used among the battery chargers provided in the object charging facility is "2", by dividing "38" that is the value obtained by adding the predicted utilization possibilities of all the specific vehicles by "2" that is the number of battery chargers which are currently not used among the battery chargers provided in the object charging facility, "19" is calculated, as the utilization index, by the utilization possibility information generating function.

Then, at step S112, by the utilization possibility information generating function of the center control device 320, on the basis of the utilization index calculated at step S111, the utilization possibility information is generated. Here, the smaller (lower) the utilization index of the object charging facility, the stronger the possibility for the request vehicle to be able to start the charge immediately just after reaching or arriving at the object charging facility. Because of this, in order to provide information of the object charging facility that has the strong possibility for the request vehicle to be able to use to the user of the request vehicle, the utilization possibility information generating function generates the utilization possibility information, for instance, by adding point information according to the utilization index and/or flag information by which the user of the request vehicle can understand that the possibility to be able to use the object charging facility is strong (namely that the utilization index of the object charging facility is small) to the charging facility information of the object charging facility.

Then, at step S113, by the utilization possibility information generating function, the utilization possibility information generated at step S112 is sent through the center communication device 310, and the utilization possibility information is provided to the vehicle-mounted unit 100 of the request vehicle. The vehicle-mounted unit 100 of the request vehicle then receives the utilization possibility information sent from the information center 300 through the vehicle-mounted communication device 110. By the displaying function of the vehicle-mounted control device 130, the received utilization possibility information is then sent to the display 170. As a consequence, the utilization possibility information is displayed by the display 170. More specifically, the object charging facility having the strong possibility for the request vehicle to be able to use (the object charging facility which the request vehicle can use with a high probability) (the object charging facility whose utilization index is small) is displayed on the screen of the display 170, for example, with a different color or a different icon from that of other charging facilities having a small possibility for the request vehicle to be able to use. With this display, it is possible to show the object charging facility which the request vehicle can use with the high probability to the user of the request vehicle.

As explained above, in the present embodiment, the charging facility which the request vehicle can use is searched as the object charging facility according to the request by the request vehicle. Then the vehicle, except the request vehicle, which has a possibility to use the searched object charging facility is determined as the specific vehicle.

Further, in the present embodiment, the possibility for the determined specific vehicle to use the searched object charging facility is predicted as the utilization possibility, then the utilization possibility information indicating the possibility for the request vehicle to use the object charging facility is generated on the basis of the predicted utilization possibility. The utilization possibility information generated in this way is then provided to the user of the request vehicle.

In this way, according to the present embodiment, since it is possible to predict the possibility that the charging facility will be used by the vehicle except the request vehicle, the information of the charging facility having the strong possibility for the request vehicle to be able to use (the information of the charging facility which the request vehicle can use with the high probability) can be properly provided to the request vehicle. Especially in the present embodiment, by predicting the time when the request vehicle reaches the object charging facility and providing the information of the charging facility having the strong possibility for the request vehicle to be able to use at the predicted arrival time, it is possible to provide the information of the charging facility having the strong possibility for the request vehicle to be able to start the charge immediately just after reaching or arriving at the charging facility, to the request vehicle.

Further, in the present embodiment, as shown in FIG. 2, the utilization probability table indicating the probability that the vehicle will use the charging facility is generated for each charging facility by the actual result based on the fact that the vehicle used the charging facility, and by using this utilization probability table, the utilization possibility for the specific vehicle to use the object charging facility is predicted. With this prediction, in the present embodiment, the possibility for the specific vehicle to use the charging facility can be properly predicted, and it is possible to properly provide the utilization possibility information indicating the possibility for the request vehicle to be able to use the charging facility, to the request vehicle.

The embodiment explained above is the one that is described to easily understand the present invention, and the present invention is not limited to this embodiment. Therefore, each element or component disclosed in the above embodiment includes all elements or components undergone engineering-change and all equivalent elements or components which are included in the technical scope of the present invention.

In the above embodiment, the storing function and the request information acquiring function of the center control device 320 correspond to a vehicle information acquiring section of the present invention. The storing function of the center control device 320 corresponds to a charge history information acquiring section and a charging facility information acquiring section of the present invention. The charging facility searching function of the center control device 320 corresponds to a searching section, a calculating section and an arrival time predicting section of the present invention. The determining function of the center control device 320 corresponds to a vehicle determining section of the present invention. The utilization possibility predicting function of the center control device 320 corresponds to a utilization possibility predicting section of the present invention. The utilization possibility information generating function of the center control device 320 and the center communication device 310 correspond to a providing section of the present invention. The traffic information acquiring function of the center control device 320 corresponds to a traffic information acquiring section of the present invention. The table generating function of the center control device 320 corresponds to a generating section of the present invention.

The invention claimed is:

1. An information providing device comprising:
a vehicle information acquiring section configured to acquire vehicle information of a plurality of vehicles;
a charge history information acquiring section configured to acquire charge history information about charge history of a plurality of the vehicles;
a charging facility information acquiring section configured to acquire charging facility information about a charging facility, which includes at least a position of the charging facility and a utilization status of the charging facility;
a searching section configured to search, according to a request from a request vehicle, for a charging facility utilizable by the request vehicle, as an object charging facility;
a vehicle determining section configured to determine, as a specific vehicle from among vehicles other than the request vehicle, a vehicle having a possibility of utilizing the object charging facility, based on vehicle information and/or charge history information of the vehicles other than the request vehicle;
a utilization possibility predicting section configured to predict, as a utilization possibility, a possibility of the specific vehicle utilizing the object charging facility, based on vehicle information of the specific vehicle; and
a providing section configured to provide information based on the utilization possibility to the request vehicle.

2. The information providing device as claimed in claim 1, wherein:
the vehicle information includes position information of the vehicle and distance-to-empty information, and
the searching section is configured to search for, as the object charging facility, a charging facility reachable by the request vehicle, based on position information of the request vehicle and distance-to-empty information of the request vehicle.

3. The information providing device as claimed in claim 1, wherein:
the searching section is configured to search for the object charging facility based on the charging facility information acquired by the charging facility information acquiring section.

4. The information providing device as claimed in claim 1, further comprising:
a calculating section configured to calculate a travelling route by which the request vehicle reaches the object charging facility based on the vehicle information of the request vehicle;
a traffic information acquiring section configured to acquire traffic information; and
an arrival time predicting section configured to predict an arrival time when the request vehicle reaches the object charging facility based on the travelling route calculated by the calculating section and the traffic information acquired by the traffic information acquiring section,
wherein the searching section is configured to search for, as the object charging facility, a charging facility utilizable by the request vehicle at the arrival time predicted by the arrival time predicting section.

5. The information providing device as claimed in claim 1, wherein the vehicle determining section is configured to:
detect a vehicle, other than the request vehicle, which exists within a circular area whose radius is a distance from a position of the object charging facility to a position of the request vehicle, the position of the object charging facility being a center, and
determine whether the specific vehicle corresponds to the detected vehicle.

6. The information providing device as claimed in claim 1, wherein:
the charge history information includes battery remaining capacity history information about a battery remaining capacity at a charge start time, and
the vehicle determining section is configured to determine the specific vehicle from vehicles other than the request vehicle based on a battery remaining capacity of the vehicles other than the request vehicle and battery remaining capacity history information of the vehicles other than the request vehicle.

7. The information providing device as claimed in claim 1, wherein:
the charge history information includes charge place history information about a place where a battery of the vehicle is charged, and
the vehicle determining section is configured to determine the specific vehicle from vehicles other than the request vehicle based on charge place history information of the vehicles other than the request vehicle.

8. The information providing device as claimed in claim 1, further comprising:
a generating section configured to generate, by an actual result based on utilization of the charging facility by a vehicle, a table that indicates a probability of the vehicle utilizing the charging facility, for each charging facility,
wherein the utilization possibility predicting section is configured to predict, as the utilization possibility, the possibility of the specific vehicle utilizing the object charging facility, based on the table for the object charging facility.

9. An information providing method comprising:
acquiring vehicle information of a plurality of vehicles and charge history information about charge history of a plurality of the vehicles;
searching, according to a request from a request vehicle, for a charging facility utilizable by the request vehicle as an object charging facility;
determining, as a specific vehicle, a vehicle that has a possibility of utilizing the object charging facility from among vehicles other than the request vehicle, based on vehicle information and/or charge history information of the vehicles other than the request vehicle;
predicting, as a utilization possibility, a possibility of the specific vehicle utilizing the object charging facility, based on vehicle information of the specific vehicle; and
providing information based on the predicted utilization possibility to the request vehicle.

* * * * *